(No Model.)
H. VACHON.
ROPE CLAMP.
No. 533,760. Patented Feb. 5, 1895.
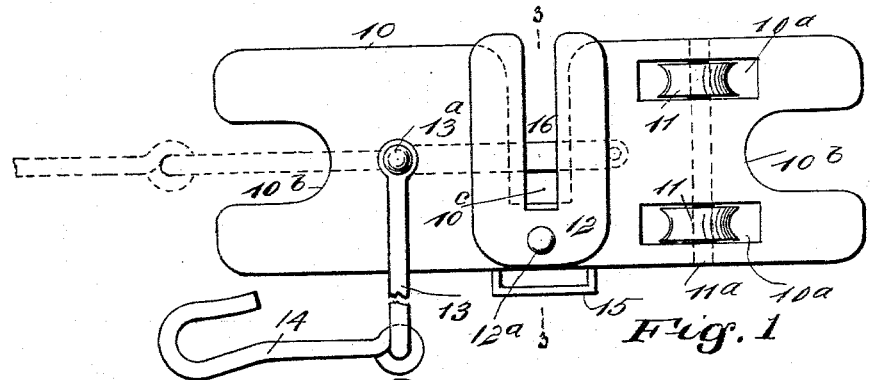
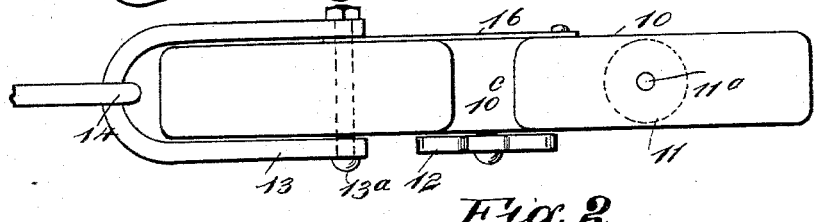
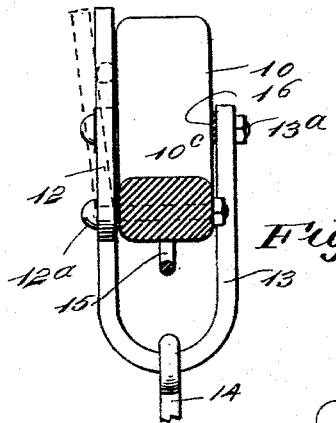
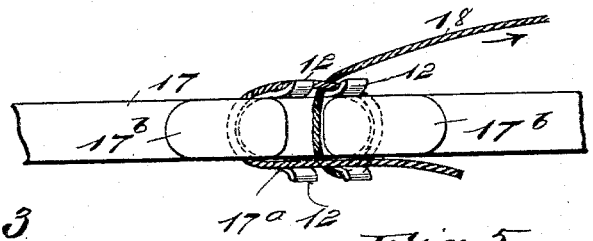
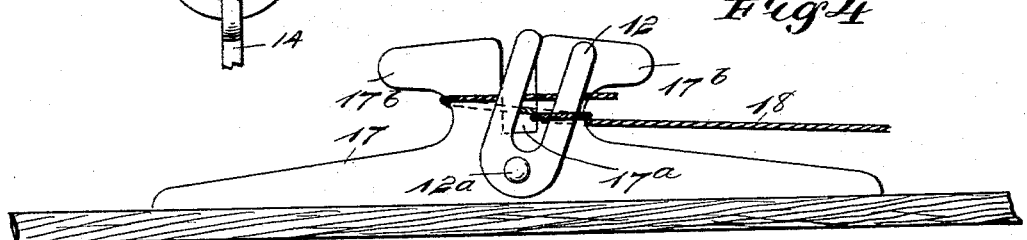
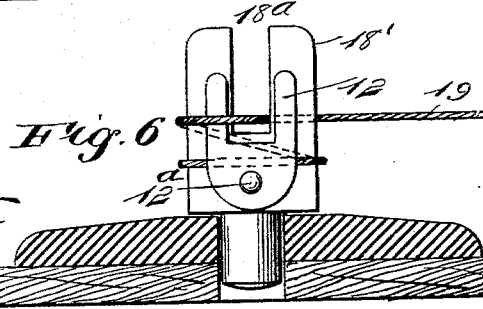
WITNESSES:
INVENTOR
ATTORNEYS.

UNITED STATES PATENT OFFICE.

HENRY VACHON, OF GOLDEN, CANADA.

ROPE-CLAMP.

SPECIFICATION forming part of Letters Patent No. 533,760, dated February 5, 1895.

Application filed April 17, 1894. Serial No. 507,829. (No model.)

*To all whom it may concern:*

Be it known that I, HENRY VACHON, of Golden, in the Province of British Columbia and Dominion of Canada, have invented a new and useful Improved Rope-Clamp for Pulleys and Belaying-Cleats, of which the following is a full, clear, and exact description.

My invention relates to an improved rope clamp for pulleys and belaying cleats, and has for its object to provide such devices with a novel, simple and efficient attachment, which will afford means to quickly and reliably secure a rope's end to a shackled pulley block, a stationary rope cleat or a rotatable stationed snubbing post, whereby said rope may be conveniently and securely retained at its attached end, so as to be adapted to moor a vessel, or retain in place any movable structure or thing whereon the other portion of said rope is affixed.

To this end my invention consists in the construction and combination of parts, as is hereinafter described and claimed.

Reference is to be had to the accompanying drawings, forming a part of this specification, in which similar figures of reference indicate corresponding parts in all the views shown.

Figure 1 is a plan view of a pulley block having the improvement in position for service thereon. Fig. 2 is an edge view of the pulley block and the improved rope clamp. Fig. 3 is a transverse sectional view of the block having the improvement, taken on the line 3—3 in Fig. 1. Fig. 4 is a side view of an ordinary fixed rope cleat, having the improved rope clamp thereon. Fig. 5 is a plan view of the rope cleat broken away at its ends, and furnished with the improved clamp in duplicate, and a secured rope; and Fig. 6 is a side view of a rotatably secured snubbing post, the improvement on said post and a rope's end portion clamped with the improvement on the post.

The pulley block 10 is formed to adapt it for the reception of the improvement, and effective service of the latter in conjunction with the block. As shown in Figs. 1, 2 and 3, the body of the block 10 is suitably elongated and has two sheave wheels 11, revolubly secured in two parallel slots in the block near one of its ends, said slots $10^a$ being laterally cut through the block so as to receive the wheels and adapt them for the usual service of such parts of a pulley block when the body 10 is hung from its other end, and as indicated in Figs. 1 and 2, the peripherally grooved wheels 11 are supported free to rotate on the same pintle rod $11^a$. The block 10 is further provided with the incurved slots $10^b$, one at each end, cut transversely and at the center of width of the block, a cross slot $10^c$ being in a like manner produced in the block body, extending from one of its edges toward the opposite edge at the longitudinal center of said body, the latter mentioned slot or notch being extended beyond the transverse center of the block.

The improvement comprises a stout flat metal plate 12 of a substantially U-shape and pivoted upon the side of the pulley block 10 through the closed end portion of the clamping piece 12, as at $12^a$, so that the space intervening its parallel limbs will be adapted to lie opposite the transverse slot $10^c$, if the limbs of the clamping piece are disposed across the block body to effect such a correspondence of slots. A shackle loop 13 is pivoted by a transverse bolt $13^a$, so as to project the bow of the body away from the slotted edge of the block and at a point intervening the clamping plate and slotted end of the block body that is farthest from the sheaves, 11, said loop being provided with a hook 14 whereby the block complete may be detachably connected with a ring eye on a vessel's deck or at any other place where it is desired to station the pulley block when it is to be used as a securing device for the end of a rope or cable.

When the block body 10 is loosely secured to a fixed point such as a wharf, or to the deck of a vessel, for the removable attachment of a rope's end portion, the latter is connected with the block body, by first introducing the end of the rope near its terminal, between the clamping piece 12 and the block body 10. The rope is then folded over the outer side of the clamping piece toward one end of the block and drawn taut through the slot in said end. Thence the rope is returned on the opposite side of the block and drawn across through the center slot of the same.

To operate effectively, the rope should be so arranged that after it is drawn through the transverse slot of the block body, and also through the slot or space between the limbs of the clamping piece 12, it may be extended between the slots occupied by the sheave wheels, so as to trend away from the shackle loop 13, thereby adapting the main portion of the rope which is thus extended, for attachment at its opposite end to any object it is desired shall be so connected with the rope.

It will be seen that if the rope's end is connected with the block body and the improved clamping piece 12, as has been described, the overlap of the rope on the latter will bind the plate 12 upon that portion of the rope that lies between the clamping piece and the block body, so that draft strain applied to the other end of the rope will increase the pressure of the clamping piece on the rope's end, and firmly retain it in a clamped condition.

The position given to the shackle loop 13 and hook 14, permits the block 10 to be secured to a suitable projection, such as a ring eye on a wharf, a vessel's deck, or the end of a rope that has been affixed to a fixed object by its other end, and thus adapt the block to retain a rope which may lead from the clamping device in any desired direction.

A staple loop 15 may be secured to the edge of the block body 10, opposite the pivoted part of the clamping piece 12 so as to afford additional means for the attachment of the block to a fixed object by a metal looped strap or any other preferred means which is available for connection with the staple loop.

If the block body is formed of wood, it is best for the purpose of insuring strength to provide a link plate 16, which is longitudinally secured on one side of the block body so as to span the transverse central slot 10$^c$ by rivets that pass from the link plate into the block body near each end of the plate.

Should it be desired to employ the block as a means for hoisting weights or other work of a like nature, the shackle loop 13 and its hook 14 are then arranged to extend in a median line away from the end of the block 10, as indicated by dotted lines in Fig. 1, the hoisting rope being rigged to have contact with the sheave wheels 11 in the usual manner for such devices, and the block body attached by its hook 14 to a fixed point which may be elevated so as to permit the hoisting rope to hang pendent, or the block may be secured to serve as a snatch block on the deck of a vessel or flooring of a dock.

In Figs. 4 and 5, the improvement is represented as applied to an ordinary belaying cleat, such as is used to secure a rope by successive coiling around its ears. The cleat 17 is of the usual form except the center slot 17$^a$, that is formed in the head of the cleat midway of its laterally projected ears 17$^d$. The clamping piece 12 is pivoted on the side of the cleat head, so that its center slot may be located opposite the slot in the cleat head, or duplicate clamping pieces 12 may be provided which are oppositely and loosely secured on the sides of the cleat head by a single pintle bolt 12$^a$, the pair of clamps being shown in Fig. 5.

The cleat 17 may be secured on a wharf, the side of a post, a mast or the deck of a vessel, and when thus attached afford means to quickly and reliably secure the end of a rope such as 18, to the cleat head.

As indicated in Figs. 4 and 5, the manner of interlocking the end of the rope with the cleat head, consists in first drawing the rope's end portion between the cleat head and one of the clamping pieces 12, then passing the rope around the head under one of the ears 17$^b$, and thence transversely through the mated slots in the head and clamping pieces 12, and finally extending the main portion of the rope across the clamping piece, which binds on the rope's end, so that draft strain on the rope will tighten the clamping piece on the rope so as to securely retain it in connection with the cleat, the reverse of the operation releasing the rope in an obvious manner.

In Fig. 6, the improved clamping device is represented as applied to a swivel post, that may be located on a vessel's deck or other place where it is desirable to temporarily attach a rope's end to it, for securing an object to which said rope is connected by its opposite end.

The post 18' as represented, is swivel secured in a base block on a portion of a wharf or a vessel's deck, but may be placed horizontally, or in an inclined position as well as in an upright plane.

The body of the post is axially slotted as at 18$^a$ and on one side has the clamping piece 12 pivoted in such a relative position as will allow the slot that separates the two limbs of the same to lie opposite the slot in the post 18'.

The attachment of a rope such as 19 to the post 18', is effected as shown in Fig. 6, the operation consisting in placing an end of the rope between the post body and the clamping piece, then passing the free portion of the rope around the post, and through the slot 18$^a$, the rope thus being made to lap upon one limb of the clamping piece, and from the opposite edge of the slot the main portion of the rope is extended away to engage any object it is designed to secure, draft strain applied to this rope being adapted to bind its end between the post and clamping piece in a manner similar to that effected on the pulley block and belaying cleat.

Having thus fully described my invention, I claim as new and desire to secure by Letters Patent—

1. As an improved means for clamping a rope, the combination with a slotted device adapted for connection with a fixed object, of a slotted clamping plate pivoted on said block so as to permit the slots of the block and plate to be aligned, substantially as described.

2. As an improved means for clamping a rope, the combination with a pulley block, the body of which is transversely slotted, of a clamping plate having two spaced limbs and pivoted on the block opposite the transverse slot in the block, substantially as described.

3. As an improved means for clamping a rope, the combination with a pulley block body slotted at each end, and also slotted transversely between its ends, and a shackle loop therefor, of a two limbed clamping plate pivoted on the block at one side opposite the transverse slot, substantially as described.

HENRY VACHON.

Witnesses:
WILLIAM McNEISH,
GORDON SUTHERLAND.